Oct. 21, 1969  J. L. FRITCH  3,473,966

BATTERY HOLDER

Filed Feb. 23, 1967  2 Sheets-Sheet 1

INVENTOR
JUNIOR L. FRITCH
BY
Burton & Parker
ATTORNEYS

Oct. 21, 1969
J. L. FRITCH
3,473,966
BATTERY HOLDER
Filed Feb. 23, 1967
2 Sheets-Sheet 2
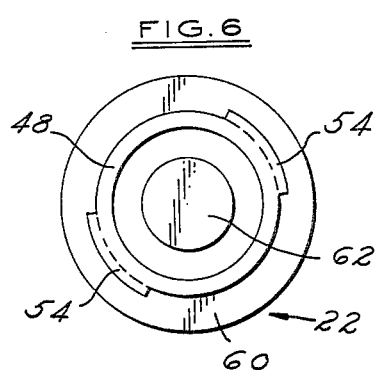
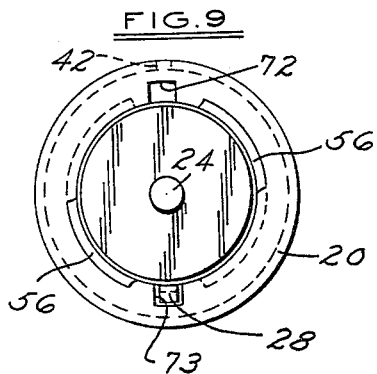
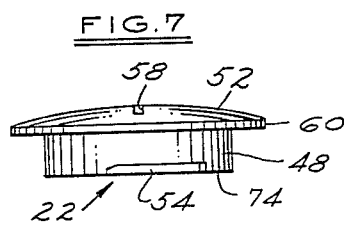
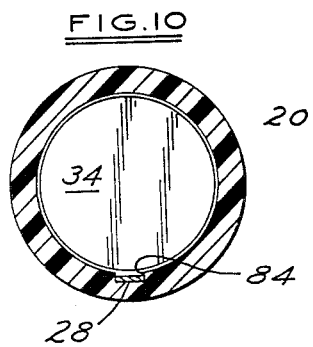
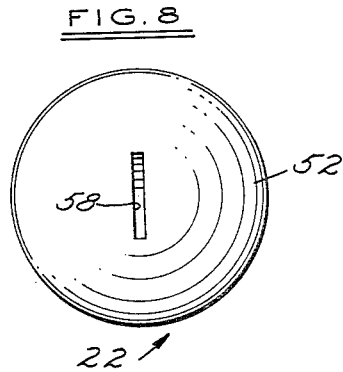
INVENTOR
JUNIOR L. FRITCH
BY
Burton & Parker
ATTORNEYS United States Patent Office 3,473,966
Patented Oct. 21, 1969

3,473,966
BATTERY HOLDER
Junior L. Fritch, Edgerton, Ohio, assignor to Robinair Manufacturing Corporation, Montpelier, Ohio, a corporation of Ohio
Filed Feb. 23, 1967, Ser. No. 618,030
Int. Cl. H01m 1/04
U.S. Cl. 136—173                    14 Claims

ABSTRACT OF THE DISCLOSURE

In general, this invention relates to a battery holder such as a power source for portable electrical instruments. The holder has a body portion which receives the battery and a cap. The electrode assembly is designed to provide both terminals at one end of the battery holder.

---

Battery holders used commercially for portable electrical instruments generally include a U-shaped metal clip, which is bolted or riveted to the instrument case; although the prior art discloses various forms of metal and plastic battery enclosures. This is because of certain disadvantages inherent in the design of the prior art devices. For example, the terminals of the prior art battery holders, generally, are provided at opposite ends, thus providing little advantage over the U-shaped clip, as the holder must be wired to the instrument circuit before the holder is secured to the panel. The battery holders which do provide both terminals at one end of the battery holder, generally make electrical contact with the battery along its side, which makes it inoperative for the more conventional battery having a paper cover. Another problem with battery holders shown by the prior art is that the electrical contact is provided by, or relies upon, a spring. The spring may be compressed under vibration or shock, disturbing the electrical contact. The spring urges the battery against the cover or cap, requiring a threaded connection between the cap and the body portion, to prevent loss of the cap during impact or vibration. Further, the spring may weaken or deteriorate upon extended storage under compression, making the battery holder inoperative and requiring replacement of the spring.

Another problem with battery holders shown by the prior art involves the securement of the holder within the instrument case or panel. The battery holder is generally not adequately secured in the case, and during vibration or shock the terminals may be loosened, eliminating the power source.

Examples of battery holders and containers shown by the prior art are as follows: 2,397,469, 2,449,811, 2,876,-273, 2,982,807, 3,061,661, 3,138,491. The battery holder shown by 2,876,273 has the further disadvantage that the central contact moves as the battery is inserted and removed from the holder.

Briefly, the battery holder of this invention has a body portion defining a generally cylindrical chamber, having an open end, adapted to receive a battery. The body portion carries a central contact, within the chamber opposite the open end, for making electrical contact with the center electrode of the battery. A cap or cover is releasably secured to the body portion over the open end of the chamber. The cap may be provided with flanges, and the body portion may be provided with bayonnet-type slots, to provide a simple and quick means of connecting the cap to the body portion. This means of connection is not available where a spring or the like urges the battery against the cover, as described hereinabove. A contact plate is received over the open end of the body portion, and retained by the cap, in electrical contact with the battery opposite the center electrode. A contact lead is disposed in electrical contact with the contact plate, and extends through the chamber to define a terminal adjacent the central contact. The contact plate, in the embodiment disclosed, is generally circular and provided with a pair of opposed ears which are received in grooves defined in the body portion. A resilient contact proportion is provided on the contact plate, which extends toward and is biased against the battery. The contact portion may be struck from the contact plate as shown in the drawings.

In the embodiment of the battery holder shown in the drawings, the cap is provided with a peripheral flange which overlies the body portion in spaced relation to receive a panel, which may be the instrument case, between the peripheral flange of the cap and the body portion. The body portion is also provided with a radial flange which abuts the instrument panel, which is spaced from the instrument case. The radial flange on the body portion, in this embodiment, is compressed between the instrument panel and the case to securely retain the battery holder under vibration and shock loading. The cover further compresses the exterior of the instrument case to provide a secure retention of the cap under vibration, etc. The body portion may also be provided with a locating ear to fasten or to be placed through a groove in the instrument panel, wherein the battery holder is temporarily secured by a retaining ring, or the like, during assembly of the instrument.

The battery holder of this invention permits the battery to be changed without removing the instrument from the case, by removing the cap and the contact plate and tipping the instrument. Another important advantage of the battery holder of this invention is that the holder can be assembled to the panel before the panel is assembled in the case, and the cap and battery is installed through the case from the outside. This advantage is achieved by providing both terminals at the rearward portion of the battery holder, in contradistinction to the battery holders now being manufactured, and shown by the prior art.

Other advantages, and meritorious features of this invention will more fully appear from the following specification, claims, and accompanying drawings, wherein:

FIGURE 6 is a bottom inside view of the cap or cover;

FIGURE 7 is a side elevation of the cap shown in FIGURE 6;

FIGURE 8 is an end view of the cap shown in FIGURE 6;

FIGURE 9 is an end view of the case with the battery removed; and

FIGURE 10 is an end cross sectional view of the assembly shown in FIGURE 1 in the direction of view arrows 10—10.

Figure 1:
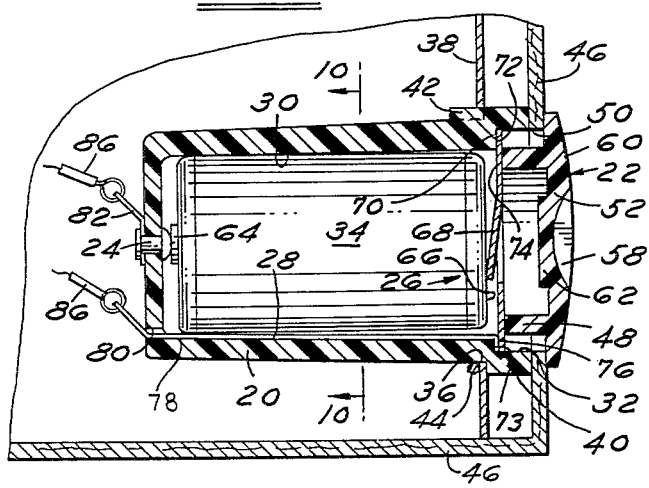
FIGURE 1 is a cross sectional view of the battery holder of this invention assembled, in an instrument case.
Figure 4:
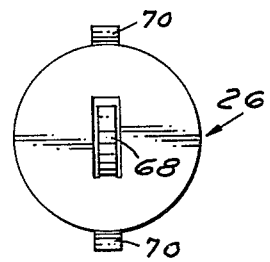
FIGURE 4 is a top elevation of a contact plate.
Figure 2:
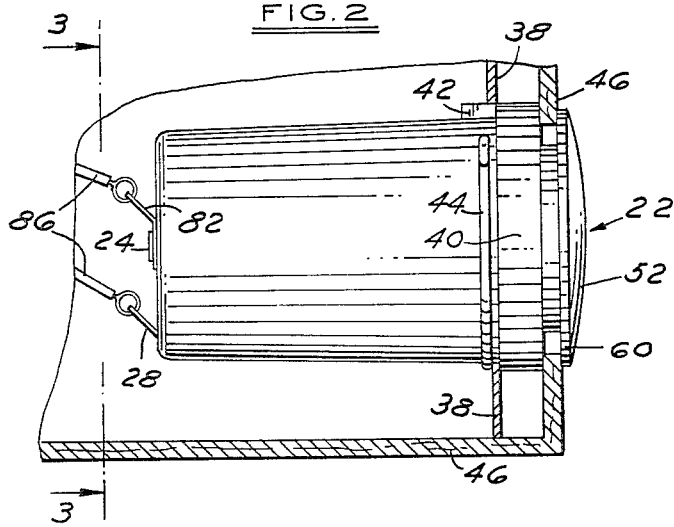
FIGURE 2 is a side elevation of the battery holder shown in FIGURE 1.
Figure 5:
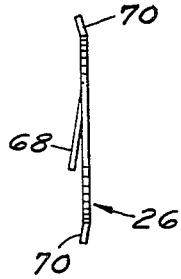
FIGURE 5 is an end view of the contact plate shown in FIGURE 4.
Figure 3:
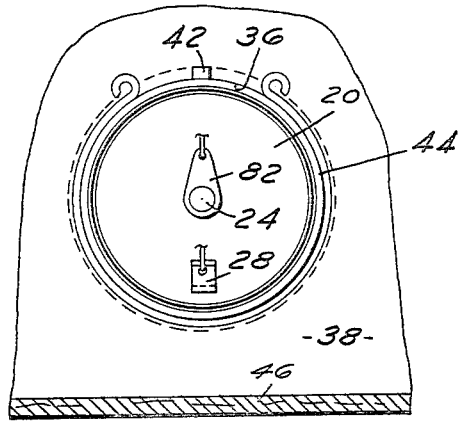
FIGURE 3 is an end view of the battery holder shown in FIGURE 2 in the direction of view arrows 3—3.

In the embodiment of my invention shown in the drawings, the battery holder includes a body portion 20, a cap 22, and the terminal assembly. The terminal assembly includes a central contact 24, a contact plate 26, and a contact strap or lead 28.

The body portion has a generally cylindrical chamber 30, which is open at one end 32, to receive a battery 34. The battery holder may be designed to receive most conventional batteries, however the "D" size battery is most commonly utilized in commercial portable instruments, such as test equipment. The body portion is adapted to be received in a circular aperture 36 defined in the instrument panel 38, or the like. A radial flange 40 is provided on the body portion which abuts the instrument panel, and the body portion may be provided with a locating ear 42, which is received in a corresponding groove defined in the panel to prevent rotational movement of the battery holder in the panel. A retaining ring 44 may be utilized to temporarily retain the body portion in the instrument panel, prior to assembly of the instrument in the instrument case 46. The retaining ring in this embodiment is a resilient wire tensioned over the body portion, which is retained thereon by frictional engagement.

The cap or cover portion 22 has a cylindrical or securing portion 48 which is received within the open end 32 of the body portion, through an aperture 50 defined in the instrument case, and an end or cover portion 52. The cylindrical portion is provided with two opposed radial flanges 54, spaced from the cover portion as shown in FIGURE 7, which are received in bayonnet-type slots 56 defined in the body portion; such that the cap is locked in place by disposing the flanges 54 in the bayonnet slots 56, and turning the cover one-quarter turn. A slot 58 has been provided in the cover portion, as shown in FIGURES 1 and 8, which may be engaged by a coin or a screwdriver or the like to lock or unlock the cap.

The cover portion 52 is provided with a radial peripheral flange 60 which overlies the radial flange 40 of the body portion, in spaced relation, to receive the instrument case 46 therebetween. The instrument case, adjacent to the aperture 50, is compressed between the flanges to securely lock the cap in place, and the flange 40 of the body portion is wedged between the instrument panel 38 and the case 46 to firmly secure the battery holder under shock and vibration loading. The cap may also be provided with suitable reinforcement, such as the circular rib 62.

The central contact 24 of the terminal assembly may be riveted in place, as shown in the drawings, or secured by other suitable means. The central contact is located generally in the axis of the body chamber 30 to provide electrical contact with the central electrode 64 of the battery. The contact plate 26 completes the circuit by providing electrical contact with the opposite end of the battery 66. The electrical contact is provided by a resilient contact portion 68, which may be struck from the body of the central plate 26, as shown in the drawings, and biased toward the battery. The contact plate of this embodiment is provided with a pair of opposed ears 70, which are received in slots 72 and 73 defined in the body portion. The ears are securely retained in the body portion by the inner end 74 of the cap, which biases the resilient contact portion 68 of the contact plate against the end of the battery 66. The resilient contact portion also biases the central electrode 64 of the battery against the central contact 24, preventing movement of the battery under vibration, etc.

The contact strap or lead 28 has an end portion 76 folded over to be received in the slot 73, to provide electrical contact with the contact plate 26, and the opposite end 78 extends through a slot 80 defined in the rearward end of the body portion, adjacent the terminal 82 of the central contact. A groove 84 may be provided in the wall of the body portion, as shown in FIGURE 10, which receives the contact strap out of the path of the battery during insertion. The battery holder is connected into the circuit of the instrument by appropriate leads 86.

It can be seen from the drawings that the battery may be connected into the instrument circuit prior to assembly of the instrument in the case 46, because both of the leads 86 extend from the back of the instrument case. Further, the battery may be changed without removing the instrument from the case merely by removing the cap 22 and tilting the case to cause the battery and the contact plate to fall out, although the cap and the battery holder are securely retained in the assembly.

Various materials may be utilized for the elements of the battery holder of this invention. For example, the body portion may be molded from a single piece of high-impact polystyrene, or the flange portion 40 may be molded separately and bonded to the body portion. Various other plastics and metals are also suitable for the body portion. The cap may also be formed of high-impact polystyrene. The contact plate may be formed of spring brass, and the contact strap or lead may be formed from soft brass, or copper. The instrument case is generally formed from a compressable material, such as leather or a plastic material resembling leather.

What is claimed is:

1. A battery holder, comprising: a body portion defining a generally cylindrical chamber having an open end adapted to receive a battery, a central contact carried by said body portion within said chamber opposite said open end for making electrical contact with the center electrode of a battery, a cap releasably secured to said body portion over the open end of said chamber, a contact plate retained between said cap and said body portion by said cap, said contact plate having a resilient contact portion for making electrical contact with the battery opposite the center electrode, and a contact lead disposed in electrical contact with said contact plate and extending through said chamber to the wall of said body portion opposite said open end such that both terminals extend from one end of the battery holder.

2. The battery holder defined in claim 1, characterized in that said contact plate is generally circular, and said contact portion is struck from said contact plate to extend toward and be resiliently biased against the battery.

3. The battery holder defined in claim 2, characterized in that said contact plate has at least two ears which are received in notches defined in said body portion and which are retained by said cap.

4. The battery holder defined in claim 1, characterized in that said cap has a peripheral flange which overlies said body portion and is spaced therefrom to receive a panel between said peripheral flange and said body portion.

5. The battery holder defined in claim 4, characterized in that said body portion is provided with a radial flange for abutting against a second panel spaced from the panel disposed between the peripheral flange and said body portion to retain the battery holder under vibration and shock.

6. The battery holder defined in claim 4, characterized in that said cap is provided with a pair of radially extending flanges spaced from said peripheral flange which are received in bayonnet slots defined in said body portion.

7. A battery holder for retaining a battery in an instrument case having an instrument panel received within the case in spaced relation to a wall of the case, comprising: a body portion adapted to be received through an aperture defined in the instrument panel, said body portion defining a body receiving chamber having an open end adapted to open toward the exterior of the case, a central electrical contact within the chamber and a contact lead adjacent the open end of the body portion chamber but spaced therefrom, a contact plate overlying the open end of the chamber in contact with said lead and adapted to make contact with the opposite end of the battery, and a cap received within the open end of said body portion chamber and releasably secured therein adapted to urge said plate into contact with the battery.

8. The instrument case defined in claim 14, characterized by said cap having a peripheral flange which overlies said peripheral flange of said body portion in spaced relation thereto which cooperates with the portion of said cap received within the open end of said body portion to compress the instrument case wall between said peripheral flanges.

9. The instrument case defined in claim 8, characterized in that said cap is provided with a pair of radially extending flanges spaced from said peripheral flange of said cap which are received within bayonnet slots defined in said body portion and tension the peripheral flange of said cap against the instrument case wall.

10. The battery holder defined in claim 7, characterized in that said cap includes a radial tab and said body portion includes a bayonnet-type slot within the chamber located axially between the end of said contact lead and the open end of said chamber, permitting releasable securement of said cap within the chamber without interference with said contact lead.

11. The battery holder defined in claim 7, characterized in that said contact plate includes an inwardly extending resilient contact adapted to make electrical contact with the battery opposite said central electrical contact.

12. The battery holder defined in claim 11, characterized in that said resilient contact is struck from said contact plate.

13. The battery holder defined in claim 11, characterized in that said plate includes two radially extending ears which are received within slots defined in said body portion within said chamber, and the end of said contact lead is received within one of said slots to contact said plate.

14. An instrument case including a battery holder, comprising: an instrument panel received within the case in spaced relation to a wall of the case, said wall and said panel including generally co-axially aligned apertures receiving a battery holder, said battery holder having a body portion received within the aperture defined in said panel and defining a battery receiving chamber therein having an open end generally aligned with the aperture in said instrument case wall, said body portion having an external radial flange abutting said panel adjacent the aperture opposite said wall and the end of said body portion in abutting engagement with said wall, and a cap releasably secured over the open end of said body portion chamber having a portion in abutting engagement with said wall adjacent the aperture.

References Cited

UNITED STATES PATENTS

| | | | |
|---|---|---|---|
| 2,876,273 | 3/1959 | Hall | 136—173 XR |
| 2,879,316 | 3/1959 | Enikeieff | 136—173 |
| 2,910,580 | 10/1959 | McCleary | 136—173 XR |
| 3,138,491 | 6/1964 | Rubio | 136—173 |
| 3,309,598 | 3/1967 | Montgomery et al. | 136—173 XR |

WINSTON A. DOUGLAS, Primary Examiner

D. L. WALTON, Assistant Examiner

U.S. Cl. X.R.

136—135